Sept. 14, 1965  H. H. MORRIS ETAL  3,206,127
PROCESS FOR UPGRADING MICA
Filed Nov. 6, 1962

INVENTORS
Horton H. Morris
Kenneth L. Turner
BY
ATTORNEYS

3,206,127
PROCESS FOR UPGRADING MICA
Horton H. Morris, Macon, and Kenneth L. Turner, Gordon, Ga., assignors, by mesne assignments, to Freeport Sulphur Company, New York, N.Y., a corporation of Delaware
Filed Nov. 6, 1962, Ser. No. 235,779
12 Claims. (Cl. 241—4)

The present invention is concerned with upgrading mica to make it suitable for quality applications such as pigment uses. More specifically, the present invention is concerned with improving the bulk density and surface area of mica by means of a fine media milling process wherein the mica is subjected, in the form of an aqueous slurry, to agitation in the presence of a fine, nonabrasive grinding media.

Mica is the generic name given to nine minerals differing somewhat in chemical composition and physical properties, but all being characterized by their presence as crystals in a book-like form with especially well developed cleavage that permits ease of splitting into thin sheets. The physical appearance of the material, the plate-like structure, the perfect basal cleavage, and the "glitter" usually identifies the mineral as mica. Muscovite, the most important commercial mica, is often indicated by the formula:

$$KH_2Al_3Si_3O_{12}$$

although substitution of iron, calcium, magnesium, sodium and other metals for aluminum or silicon often occurs. Sericite is a fine, scaley, or fibrous kind of muscovite. The term is usually confined to light mica, which is secondary.

Mica is often recovered as a by-product of other benefaction processes. Thus, the kaolin deposits of Georgia are usually overlain, bedded on, and sometimes interbedded with large volumes of a white, fine mica. The removal of the mica or mica-like material is one of the processes to be accomplished during kaolin benefaction, and the waste mica often constitutes an appreciable portion of the waste tonnage from such a process. While this by-product mica is usually of good color and may be classified to meet size specifications necessary for many industrial uses, the material has a high bulk density often in excess of 20 to 25 pounds per cubic foot. Thus, it cannot meet specifications such as ASTM D–607–42 for Pigment Mica, which requires bulk densities (often termed apparent densities) of 10 pounds per cubic foot (maximum). There thus exists a demand for means for converting this high bulk density mica, which is generally considered a waste material, into the much desired, high priced, low bulk density mica which can meet specifications for pigmentary use, e.g. paints, paper, roofing materials, rubber, wallpaper, plastics, etc.

Further, in standard mica mining procedures, the desired product is usually sheet mica. However, its preparation is accompanied by the formation of large quantities of scrap mica which it is desirable to convert into a form suitable for use in paints, wallpapers, tiles, cables, etc. While the dry grinding of such mica scrap such as by use of jet mills, etc., gives a product suitable for some purposes, dry grinding results in a product having little or no "glitter" or gloss, and such products are not satisfactory for many pigment uses. Dry ground mica looks more like ordinary flour, whereas wet ground mica is distinguished by its sheen. Additionally, the dry grinding processes are normally characterized by their relatively high energy costs.

Heretofore, various wet grinding processes have been suggested. Typically, mica has been processed in Chaser mills of annular steel or wooden pans, the mills containing two, three, or more rollers running at 20 to 40 revolutions per minute. The mills require very careful control of the water/mica ratio since too little water will give a burned mica product and little or no grinding will occur if too much water is added. Even the thinnest mica flakes are tough, elastic and too slippery to be grasped by ordinary grinding machines. Thus, the wet ground mica produced by this process in general costs several times as much as the dry ground mica to produce since the process is slow and inefficient, a one ton charge often requiring 4 to 8 hours for completion.

There thus exists a demand for a wet grinding process whereby mica, either as mined or as recovered during the benefaction of other materials, may be upgraded to be suitable for pigmentary uses, i.e. their bulk densities reduced to less than about 15 pounds per cubic foot and preferably less than about 10, e.g. 7 to 10 pounds per cubic foot. Additionally, it is often desired that the mica have a surface area of greater than 4 square meters per gram. In accordance with the present invention, these results may be obtained in a highly effective manner. In fact, it appears that no other procedure presently being employed can produce a wet ground mica of the quality produced in accordance with the present invention since it has been found that even high grade, wet ground commercial micas can be substantially improved by the present process. More specifically, a liquid slurry of mica is subjected to delamination under conditions protecting the mica from contamination by abrasion by subjecting the mica to a fine milling mechanical action in the presence of a fine, nonabrasive, resilient grinding media. The milling action can be visualized as being a combination of (1) mild viscous shear milling due to the agitation of the viscous mass composed of fine milling media, water and mica; (2) mild percussive milling due to the multiplicity of low inertia impacts afforded by the collisions of the fine milling media with itself and with the mica; and (3) mild frictional milling produced by the combination of the rubbing action of the fine media to itself and of the fine media to the mica. These three actions occur simultaneously and bring about the delamination of the plate-like mica structure with the consequent result that the treated mica has substantially decreased bulk density as well as increased surface area and is upgraded so as to well satisfy the specifications for pigmentary use.

In general, the mica to be treated will have a size range of —20 mesh to +400 mesh or finer, preferably —60 mesh to +325 mesh, as well as a bulk density above 10 pounds per cubic foot. The mica is slurried with water in amounts so as to generally fall in the range of 5 weight percent to 50 weight percent, preferably 15 weight percent to 30 weight percent mica based on total mica and solution (excluding grinding media). About 1 to 4, preferably 2 to 3 weight parts of grinding media are employed per part of mica to be treated.

The nonabrasive, resilient grinding media is normally a plastic and may take the form of beads, pellets, etc. Suitable plastic grinding media include nylon, styrene-divinyl benzene copolymers, and similar materials generally of approximately the same hardness and resiliency characteristics. The delamination process is conducted for an appropriate time period to give the desired degree of bulk density and surface area improvement, it generally being desired to obtain a product having a bulk density of less than about 15 pounds per cubic foot, preferably less than 10 pounds per cubic foot.

The mica delamination process may be carried out in a batch or continuous manner. For example, the mica dispersed in water may be admixed with plastic pellets about ⅛" in diameter and ⅛" long in a weight ratio of about 5 parts of resilient plastic grinding medium to 3 parts of mica to be treated. The resulting admixture is then subjected to the combined shear, percussive and frictional milling by a vigorous agitation of the suspension of mica and grinding media, and continuing the process until the desired degree of upgrading of the mica has been realized. A continuous delamination process may be characterized by feeding a slurry of mica continuously to the delamination apparatus, recovering therefrom an upgraded mica and, if desired, recycling a portion of the mica for further improvement. Thus, the mica withdrawn may be segregated into high and low bulk density fractions, with the high bulk density fraction being recycled to the unit. Segregation of the particles according to extent of delamination may be accomplished by standard sedimentation techniques, the partially delaminated booklets settling more rapidly than the delaminated material. The use of hydroclones or of mechanical centrifuges to accomplish this purpose is also possible.

The use of a fine, resilient, plastic grinding media such as nylon, polyethylene, polypropylene, or other plastic has the advantage that the objectionable abrasion of apparatus which occurs by use of nonplastic media, such as metal balls, is avoided. Thus, steel apparatus can be employed without objectionable contamination of the media. Delamination is thus effected by a rapid agitation or flow of the fine, nonabrasive grinding media in suspension with the mica, thus effecting combined shearing, percussive and frictional milling of the mica with its resultant conversion to a mica product of improved bulk density.

If desired, after recovery of the mica from the delamination unit, it may be subjected to various purification procedures well known in the art. It may be filtered, dried, crushed, and/or pulverized or given other conventional mica product recovery treatments, such as flotation or extraction to separate impurities.

It has been recently suggested to employ a similar delamination process with respect to treating kaolin clay. However, the differences in structure between mica and kaolin are well known and processes suitable for the treatment of one are frequently proven to be unsuitable for the treatment of the other.

Micas are classified as non-clay minerals (of Grim-Clay Mineralogy, McGraw-Hill (1953), see p. 4, 5, 9 and 27) and differ from kaolin in chemical composition, size, structure and reactions. While the largest particles dealt with in delaminating kaolin are of the order of twenty microns in size (equivalent spherical diameter) and the major portion is below ten microns in size, the mica booklets, on the other hand, are primarily above 40 microns in size and range upward to 1000 microns or larger.

Kaolin booklets are held together primarily by Van der Wall's forces (i.e. dipole interaction), while mica booklets are bound by ionic (i.e. chemical) bonds. Thus it is surprising that a process suitable for kaolin delamination could disrupt such chemical bondings of mica. However, as pointed out in Indian Patent 55,454 as well as elsewhere, "Mica . . . is so tough, elastic and smooth that it cannot be effectively ground by the usual type of fine grinding equipment. The wet grinding of mica particularly has to be done in such a way that the ground product retains its natural brilliance and gloss." This problem of maintenance of brilliance and gloss, as well as the mica characteristics of toughness, elasticity, smoothness are not encountered as problems in kaolin delamination.

The various aspects and the modifications of the present invention will be made more clearly apparent by reference to the following description, drawing and accompanying examples.

EXAMPLES

Figure 1:
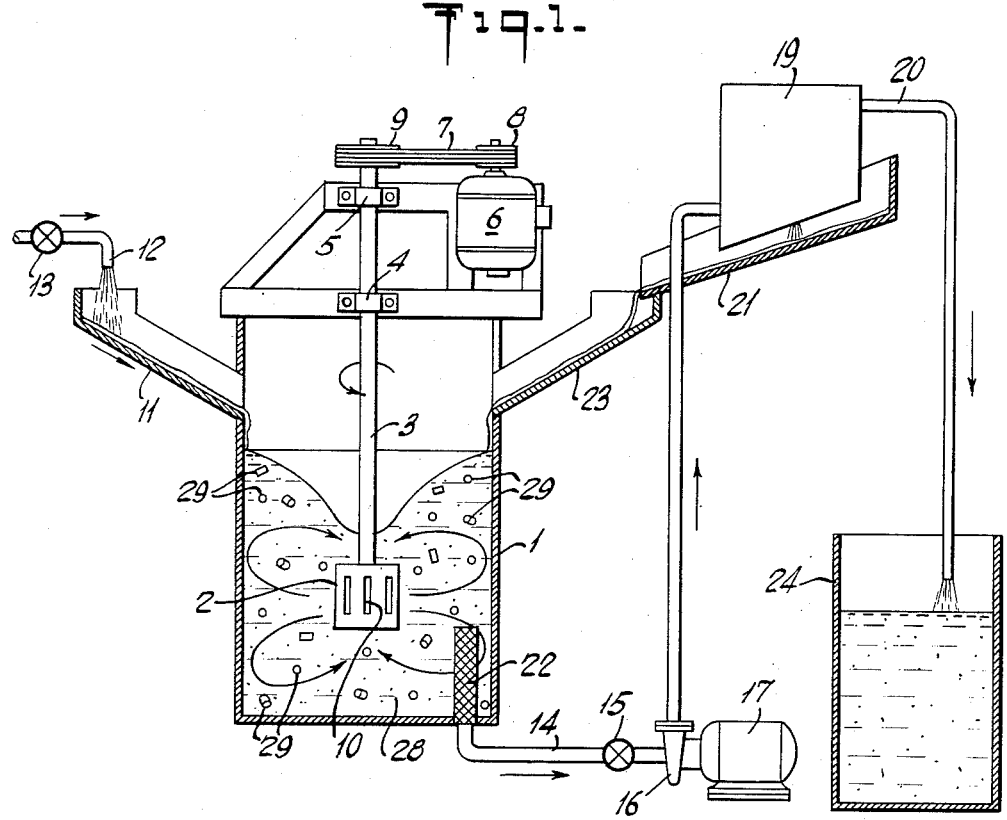
FIGURE 1 illustrates one of various apparatus configurations suitable for the continuous upgrading of mica in accordance with the present invention.

In Examples 1, 2 and 3, various types of mica samples were substantially upgraded in accordance with the present invention. The examples illustrate the use of the present mica delamination process on the by-product mica obtained from kaolin manufacture, high grade, fine, white mica and a sample of commercial wet ground pigment grade mica.

In each example, the following procedure was employed.

600 g. of the mica sample was mixed with 2400 g. of water, 1 to 2 g. of tetrasodium pyrophosphate and 1000 g. of nylon pellets. The nylon pellets were $\frac{1}{10}''$ in diameter and $\frac{1}{10}''$ in length and are sold by the National Aniline Division of Allied Chemical and Dye. The mixture was then placed in a 1 gallon container. A 1 gallon glass jar, 1 gallon polyethylene jar, or a 1 gallon paint can were employed interchangably in Examples 1, 2 and 3. The container was then sealed and shaken for five hours by the use of an oscillating "Red Devil" paint shaker which operated at about 1100 cycles per minute. The apparatus is marketed by the Red Devil Tools Company, Union, New Jersey.

At the end of this period, the nylon was removed from the slurry by means of a coarse screen having a mesh size of about 20 mesh. The slurry was then flocculated by the addition of a small amount of $H_2SO_4$, thereafter being filtered, dried at a temperature of about 100° C. to 130° C., crushed and pulverized once in a Raymond Laboratory Pulverizer equipped with a 0.024″ opening screen. The control samples (feed mica) were similarly pulverized with the Raymond Laboratory Pulverizer in order that the results be on a fully comparable basis.

EXAMPLE 1

Crude mined kaolin clay was crushed and dispersed (with tetrasodium pyrophosphate) in water. The slurry was then passed through a 6″ Dorr Clone unit to remove oversized materials, e.g. lumps of clay and large sand, etc., and was then passed through a P–50 Dorr Clone unit designed to remove materials above about 15 to 20 microns in size. The Dorr Clone units are cylindro-conical units utilizing centrifugal force in place of gravity to effect particle size classification, and are sold by Dorr-Oliver, Inc., Stamford, Conn. The rejected material consisting of mica, sand and coarse clay along with traces of organics and iron and titanium-containing impurities was then screened through a 20 mesh screen to remove the organic materials, e.g. twigs, leaves, etc. It was then passed through a 200 mesh screen so as to retain the mica on the screen, the other by-products passing therethrough.

The mica so collected after being dried and pulverized by means of a hammer mill had the properties listed in Table I and is denoted as "P–50 reject mica." The surface area and bulk density of this reject mica was determined before and after subjecting the mica to the delamination process of the present invention in accordance with the procedure indicated in the introduction to the examples.

As shown below in Table I, the improvement in bulk density and the reduction in particle size as indicated by the screen analysis and surface area are marked. This reject mica, a waste product previously thrown away or suitable for only the very cheapest of mica uses, was upgraded to such a degree that it had the properties of the highest grades of pigment mica, i.e. bulk density reduced from 25 to 11 pounds per cubic foot, while increasing the surface area from 3.2 to 4.8 square meters per gram. The color of the product mica was very white and was considered excellent. Analysis of the reject mica treated in accordance with the present invention indicated that the mica could be classed as a sericite mica.

EXAMPLE 2

A sample of relatively fine mica was obtained from the clay slip of Example 1 after the removal of the coarser mica by the P-50 Dorr Clone. The separated slip was passed through a 250 mesh screen. A small amount, e.g. about 0.25 weight percent of fine white mica, was retained on the screen. Thus, this mica represented the finest and highest quality portion of the mica recoverable from the clay slip by screening. This mica, hereinafter termed "screen house mica" had properties similar to those of commercial high quality wet ground pigment mica, its properties being indicated in Table I. A sample of this fine white mica was then subjected to the delamination process of the present invention as described above and the product, termed "product from the screen house mica" evaluated.

As shown in Table I, by subjecting this fine grade mica to the delamination treatment of the present invention, its bulk density and surface area were dramatically improved. The extremely low bulk density of about 7 pounds per cubic foot and high surface area of about 8 square meters per gram illustrate the especially high quality mica product obtained in accordance with the present invention.

EXAMPLE 3

A sample of commercial wet ground pigment grade mica sold by the Asheville-Schoonmaker Company, Newport News, Virginia, was subjected to the present upgrading process. This commercial pigment grade mica initially had the properties indicated in Table I, it thereafter being subjected to the delamination process indicated in the introduction prior to Example 1. The material, after delamination, was denoted as "product from commercial mica" and had the properties indicated in Table I.

The marked improvement of this fine grade of mica by the use of the present process is evident. Bulk density was reduced to nearly half its initial value, thus demonstrating that micas treated in accordance with the present invention are especially high quality, wet ground, pigment grade mica products.

EXAMPLE 4

With reference to the attached drawings, shown therein is a typical system for continuously delaminating mica.

With particular reference to FIGURE 1, an aqueous slurry of mica having a screen size of about 20 mesh to 325 mesh (mica being present in an mount of 20 weight percent of the slurry) is passed through inlet pipe 12 via valve 13. The slurry passes through trough 11 into delamination chamber 1. The delamination chamber or tank 1 has positioned therein a rotating agitator 2 mounted on shaft 3 which is in turn supported by bearings 4 and 5. Rotation is effected by motor 6 and the use of belt 7, belt 7 passing over pulley 8 on the motor and pulley 9 on the shaft. Agitator 2 may take a wide variety of shapes or forms. In the present example, it is a cylinder of about 6" in diameter and 6" in height with 6 slots ⅜" in width, denoted as 10 in the drawing, being positioned around the cylinder.

The fine grinding medium is denoted by numeral 29.

Figure 2:
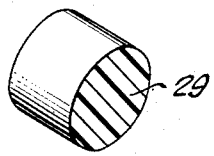
FIGURE 2 depicts a typical form of the fine, nonabrasive grinding media employed.

In the present example, it takes the form of a cylinder ¼" in diameter and ¼" in length of nylon which is present in about 2 parts by weight per part of mica in vessel 1. An enlarged view of the nonabrasive grinding media is shown in FIGURE 2. It will be understood that the tank will naturally contain a larger number of grinding elements than is depicted in FIGURE 1 in order that during the rapid agitation of the admixture of mica suspension and polymer grinding media there will be the continuous delaminating action afforded by combined elements of shear, percussive and frictional milling. Cylindrical agitator 2 will be rotated at a relatively rapid rate, e.g., around 1800 r.p.m. with resulting rapid and intense movement supplying the milling action of the cake previously indicated, i.e., combination of shear milling, percussive milling and friction milling to bring the desired mica delamination.

Delaminated mica is withdrawn through outlet 22 covered normally with a screen of about 80 mesh so as to ensure that mica of sufficient delamination is withdrawn. Withdrawn mica is then passed via line 14 through control valve 15 to pump 16 wherein motor 17 may be employed to convey the delaminated mica suspension to unit 19. Unit 19 can be employed where it is desired to recycle at least a portion of the withdrawn mica product for further treatment. It may take a wide variety of forms and is shown simply in the drawing as box 19. For example, it may be one or more cyclones or alternate means for separating the mica in accordance with its degree of delamination, i.e., bulk density. Mica of insufficient delamination is thus recycled from unit 19 by means of troughs 21 and 22 to vessel 1 for further contact with the fine, nonabrasive grinding medium. Mica product recovered via line 20 may be passed to a further treating zone 21 which may take the form of a settling or filtration zone. The mica product may thus be treated by any of a number of finishing processes not shown in the drawing; such as, classification, screening, flotation, pulverizing, drying, etc.

Thus, by operating in accordance with the system depicted in FIGURE 1, the bulk density of the mica fed to vessel 1 is substantially improved, the product recovered via line 20 having a greatly reduced bulk density as well as, in general, an increased surface area.

Various modifications may be made to the present invention. For example, various means for ensuring proper agitation of the mica and fine, nonabrasive grinding media can be employed.

Having described the present invention, that which is sought to be protected is set forth in the following claims.

What is claimed is:

1. An improved process for improving pigmentary properties of mica having a bulk density of more than 15 pounds per cubic foot which comprises subjecting an aqueous slurry of said mica and a fine, nonabrasive grinding media to rapid agaitation so as to effect fine milling mechnical action including (a) mild viscous shear milling due to agitation of the admixed fine milling media, water and mica, (b) mild percussive milling via multiplicity of low inertia impact collisions of said milling media with said mica, (c) mild frictional milling by

*Table I*
MICA DELAMINATED BY FINE MEDIA MILLING

| Sample No. | Description | Bulk Den., lb./ft.$^3$ | $SiO_2$ | $Al_2O_3$ | $K_2O$ | $Na_2O$ | $Fe_2O_3$ | CaO | MgO | Ign. Loss | S.A., M.$^2$/g. |
|---|---|---|---|---|---|---|---|---|---|---|---|
| 1 | P-50 reject mica Examp. 1 | 25.6 | 45.10 | 38.40 | 2.30 | 1.08 | 0.54 | 0.08 | 0.09 | 12.10 | 3.21 |
| 2 | Product from P-50 Reject mica, Examp. 1. | 11.0 | 45.20 | 38.42 | 2.70 | 1.00 | 0.78 | 0.10 | 0.10 | 11.31 | 4.82 |
| 3 | Screen House mica | 12.0 | 44.2 | 37.47 | 4.65 | 1.30 | | | | 10.39 | 3.25 |
| 4 | Product from Screen House mica | 7.25 | 44.90 | 39.04 | 4.20 | 1.25 | 1.18 | 0.08 | 0.11 | 8.69 | 8.22 |
| 5 | Commercial Wet Ground Pig. grade mica ("Trade Name"). | 16.7 | 52.4 | 31.36 | 3.45 | 1.00 | 2.18 | 0.29 | 0.15 | 8.75 | 3.60 |
| 6 | Product from Commercial mica | 8.0 | 52.20 | 29.0 | 3.13 | 1.14 | 2.04 | 0.36 | 0.24 | 9.40 | 3.11 | a combination of the rubbing action of said fine milling media and said mica, and recovering a mica product of bulk density of less than 15 pounds per cubic foot.

2. The process of claim 1 wherein said fine, nonabrasive grinding media is a resilient material.

3. The process of claim 1 wherein said grinding media is a plastic material.

4. The improved process of claim 1 wherein said plastic grinding media comprises nylon.

5. The improved process of claim 1 wherein agitation is continued for a sufficient period so that the bulk density of said mica product is less than 10 pounds per cubic foot.

6. An improved process for producing mica having a bulk density of less than 15 pounds per cubic foot which comprises rapidly agitating an aqueous slurry of mica with fine, nonabrasive relatively small size nylon particles so as to effect resulting fine milling action including (a) mild viscous shear milling due to agitation of admixed nylon grinding media, water and mica, (b) mild percussive milling via multiplicity of low inertia impacts between said nylon grinding media and said mica, (c) mild frictional milling by the rubbing action of said fine nylon grinding media and said mica, continuing said agitation for sufficient time to reduce the bulk density of said mica to less than 15 pounds per cubic foot and recovering mica of improved properties from said slurry.

7. The improved process of claim 6 wherein mica is recovered from said slurry and subjected to drying at elevated temperatures.

8. The improved process of claim 6 wherein agitation is continued for a sufficient period to produce a mica having a bulk density of less than 10 pounds per cubic foot.

9. An improved process for producing mica having a bulk density of less than 15 pounds per cubic foot which comprises rapidly agitating an aqueous slurry of mica with fine nonabrasive relatively small size plastic particles so as to effect resulting fine milling action including (a) mild viscous shear milling due to agitation of admixed plastic grinding media, water and mica, (b) mild percussive milling via multiplicity of low inertia impacts between said plastic grinding media and said mica, (c) mild frictional milling by the rubbing action of said fine plastic grinding media and said mica, continuing said agitation for sufficient time to reduce the bulk density of said mica to less than 15 pounds per cubic foot and recovering mica of improved properties from said slurry.

10. An improved process for producing mica having a bulk density of less than 15 pounds per cubic foot which comprises rapidly agitating an aqueous slurry of mica with fine nonabrasive relatively small size plastic particles chosen from the group consisting of nylon, styrene divinyl benzene copolymers, polyethylene and polypropylene particles so as to effect resulting fine milling action including (a) mild viscous shear milling due to agitation of admixed plastic grinding media, water and mica, (b) mild percussive milling via multiplicity of low inertia impacts between said plastic grinding media and said mica, (c) mild frictional milling by the rubbing action of said fine plastic grinding media and said mica, continuing said agitation for sufficient time to reduce the bulk density of said mica to less than 15 pounds per cubic foot and recovering mica of improved properties from said slurry.

11. The improved process of claim 10 wherein said agitation is continued for a sufficient period of time to produce a mica having a bulk density of less than 10 pounds per cubic foot.

12. An improved process for producing mica having a bulk density of less than 10 pounds per cubic foot which comprises treating mica which initially has a bulk density of more than 10 pounds per cubic foot by rapidly agitating an aqueous slurry of mica with fine nonabrasive relatively small plastic particles so as to effect resulting fine milling action including (a) mild viscous shear milling due to agitation of admixed plastic grinding media, water and mica, (b) mild percussive milling via multiplicity of low inertia impacts between said plastic grinding media and said mica, (c) mild frictional milling by the rubbing action of said fine plastic grinding media and said mica, continuing said agitation for sufficient time to reduce the bulk density of said mica to less than 10 pounds per cubic foot and recovering mica of improved properties from said slurry.

References Cited by the Examiner

UNITED STATES PATENTS

| 2,498,111 | 2/50 | Mattson | 241—4 |
| 3,030,746 | 4/62 | Firestine et al. | 51—313 X |
| 3,034,859 | 5/62 | Gunn et al. | |
| 3,056,561 | 10/62 | Hukki | 241—172 X |

OTHER REFERENCES

McDaniel et al.: 2,547,336, Apr. 3, 1951, 241–4.

Tumbling Finishing Technique (Goldman), from The Tool Engineer, vol. 26, No. 5, May 1951, pages 38 and 39 relied upon (from pages 37–40). Copy in Scientific Library and 51-313 (Gr. 340(1)).

ROBERT C. RIORDON, *Primary Examiner.*

JOHN C. CHRISTIE, J. SPENCER OVERHOLSER,
*Examiners.*